United States Patent
Mehta

(10) Patent No.: US 12,417,164 B2
(45) Date of Patent: *Sep. 16, 2025

(54) ADAPTIVE HARDWARE TRACING

(71) Applicant: Synopsys, Inc., Sunnyvale, CA (US)

(72) Inventor: Aarati Kalpesh Mehta, Hyderabad (IN)

(73) Assignee: Synopsys, Inc., Sunnyvale, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 18/354,643

(22) Filed: Jul. 19, 2023

(65) Prior Publication Data

US 2025/0028627 A1    Jan. 23, 2025

(51) Int. Cl.
*G06F 11/362* (2025.01)

(52) U.S. Cl.
CPC .................... *G06F 11/364* (2013.01)

(58) Field of Classification Search
None
See application file for complete search history.

(56) References Cited

U.S. PATENT DOCUMENTS

| | | | |
|---|---|---|---|
| 2010/0257510 A1* | 10/2010 | Horley ............... | G06F 11/3636 717/128 |
| 2011/0219376 A1* | 9/2011 | Williams ............ | G06F 11/3466 718/100 |
| 2012/0216080 A1* | 8/2012 | Bansal ................ | G06F 11/348 714/45 |
| 2015/0143343 A1* | 5/2015 | Weiss ................. | G01R 31/31705 717/128 |
| 2016/0356841 A1* | 12/2016 | Hopkins .......... | G01R 31/31705 717/128 |
| 2023/0061419 A1* | 3/2023 | Beaumont-Smith ........ G06F 11/3037 | |

OTHER PUBLICATIONS

A. B. T. Hopkins and K. D. McDonald-Maier, "Debug support strategy for systems-on-chips with multiple processor cores," in IEEE Transactions on Computers, vol. 55, No. 2, pp. 174-184, Feb. 2006. (Year: 2006).*

* cited by examiner

*Primary Examiner* — Andrew M. Lyons
(74) *Attorney, Agent, or Firm* — Fenwick & West LLP

(57) ABSTRACT

An adaptive hardware trace circuit is presented. The adaptive hardware trace circuit may include one or more trace circuits, a trace port funnel circuit, a trace FIFO buffer, and an adaptation logic circuit. Each trace circuit may be coupled to a processor core and configured to monitor and encode trace data generated by a processor core. The trace buffer may be configured to store the trace data generated by the processor cores. The adaptation circuit may be configured to receive, from a user, one or more buffer capacity thresholds and a priority level assigned to each trace. The adaptation circuit may map ranges of trace buffer capacities to corresponding sets of actions. The adaptation circuit may detect a buffer capacity to determine a set of one or more actions associated with the buffer capacity and execute the set of one or more actions.

18 Claims, 6 Drawing Sheets

200

Receive, from a user, an indication to enable a trace for one or more processor cores and a priority level for each of the enabled traces
205

↓

Receive, from the user, one or more trace FIFO buffer capacity thresholds
210

↓

Perform a trace operation
215

↓

Store trace data in a trace FIFO buffer
220

↓

Detect a trace FIFO buffer capacity level
225

↓

Identify the set of one or more user-defined actions associated with the trace FIFO buffer capacity
230

↓

Perform the set of one or more user-defined actions
235

*FIG. 2*

ADAPTIVE HARDWARE TRACING

TECHNICAL FIELD

The present disclosure generally relates to a multi-processor system, more specifically to an adaptive hardware trace system.

BACKGROUND

In recent years, System-on-Chip (SoC) technology has evolved rapidly and has seen growth in various industries. A trend in SoC technology includes moving from single core systems to multi-core systems to take advantage of the advances provided by silicon technology. Due to Moore's Law and the low cost of silicon gates, our ability to integrate more logic on a single die has increased significantly. The availability of intellectual property (IP) cores like central processing unit (CPU) core, graphic processing unit (GPU) cores, etc. has allowed system designers to integrate these complex IPs to implement SoCs.

SUMMARY

Embodiments of the present disclosure relate to an adaptive hardware trace circuit. The adaptive hardware trace circuit may include one or more trace circuits, a trace port funnel circuit, a trace buffer, and an adaptation logic circuit. Each trace circuit may be coupled to a processor core and captures the trace data generated by the processor core. The trace port funnel circuit may be coupled to receive trace data from the one or more trace circuits and may be configured to combine the trace data from multiple streams into a single stream of trace data. The trace buffer may be coupled to the output of the trace port funnel circuit and may be configured to store the single stream of trace data. In some embodiments, the trace buffer may be implemented as a first in first out (FIFO) buffer.

The adaptation circuit is coupled to the trace buffer and may be configured to detect the capacity of the trace buffer. The adaptation circuit identifies one or more actions (e.g., user-defined actions) associated with the buffer capacity and transmits signals the trace circuits to execute the one or more actions. The adaptation circuit further signals the trace port funnel circuit to execute the one or more actions by generating a trace flow control signal and transmitting the trace flow control signal to the trace port funnel circuit. The adaptation circuit receives one or more buffer capacity thresholds, which indicates a range of buffer capacity values that correspond to one or more actions. Some examples of an action include reducing the sampling rate of trace data, disabling a trace, or disabling a feature within a trace. In some embodiments, the adaptation circuit receives one or more pairs of buffer capacity thresholds, where each pair of buffer capacity threshold includes an upper and lower buffer capacity threshold.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 2 is a flowchart illustrating an example process 200 of executing a set of one or more actions in response to a detected trace FIFO buffer capacity, in accordance with an embodiment.

DETAILED DESCRIPTION

Figure 1:
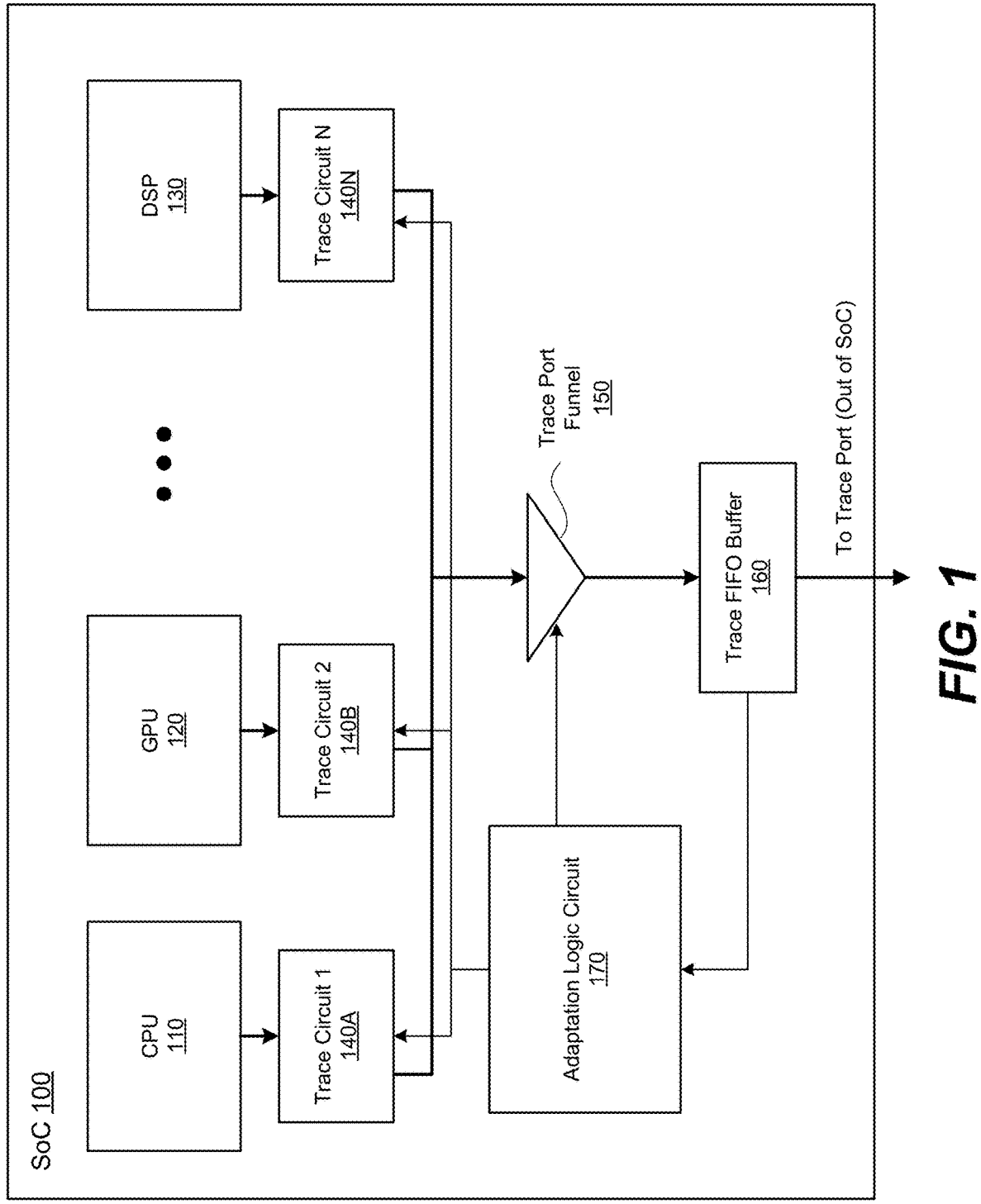
FIG. 1 is a top-level circuit block diagram illustrating an example adaptive hardware trace circuit architecture, in accordance with an embodiment.

Aspects of the present disclosure relate to an adaptive hardware trace circuit. A type of debugging tool is a hardware trace-based functional and performance debugging tool, which allows a software developer to derive insights into a system's behavior and performance. The hardware trace-based debugging tool may capture a trace of the signals and data passing between various components of the system.

However, the retention of critical trace data and effective utilization of the trace buffer is a challenge for hardware trace-based debugging tools. Some approaches use compression techniques to reduce bits generated from traces, and a FIFO buffer is added to store data during these surges. Nevertheless, if the rate at which data is generated exceeds the rate at which data is written out, the FIFO buffer may become full, and data will be lost until the FIFO buffer has available memory again. A sudden surge of trace data being generated by the multiple cores may lead to a system exceeding the bandwidth of the trace port of the SoC and running out of resources to hold or transport the trace data. As a result, the system may randomly drop trace data, resulting in a loss of important trace data. Thus, as SoCs grow increasingly complex, a proficient tool is needed for developing and debugging software on these SoCs, and to perform performance tuning of these SoCs.

The present adaptive hardware trace circuit allows developers to identify and prioritize desired traces. The present system may receive an assigned priority level to each trace and configure one or more trace buffer capacity thresholds. Each trace buffer capacity threshold may indicate a range of buffer capacities that correspond to a set of one or more actions (e.g., a user-defined action or pre-defined action). For example, a first buffer capacity threshold may be set to 25% capacity of the trace buffer. As such, the range of 0% capacity to 25% capacity may correspond to a first set of one or more actions. The adaptive hardware trace circuit may detect and monitor the capacity of the trace buffer and may be configured to execute the set of actions corresponding to the capacity of the trace buffer. An example of an action includes dropping traces of a priority level (e.g., a lowest priority level). As a result, by allowing the user to identify desired traces, the present system may mitigate the loss of critical trace data when a trace buffer is full.

Technical advantages of the present disclosure include, but are not limited to, reduced debugging time, flexibility in defining trace parameters, and efficient resource utilization. The present disclosure introduces trace priority which allows a user to define the importance of different traces generated by computational cores, enabling the adaptive hardware trace circuit to capture the traces which are most relevant to the current system issue being debugged, thus allowing users to debug system issues more effectively and reduce debugging time. Further, lower priority traces are dropped when resources are limited, thus reducing the volume of traces captured and optimizing resource utilization. As a result, utilization of computing resources may be reduced.

FIG. 1 is a top-level circuit block diagram illustrating an example SoC including an adaptive hardware trace circuit, in accordance with an embodiment. The System-on-Chip (SoC) 100 component is embodied as one or more integrated circuit (IC) chips and performs various data processing processes. The SoC 100 may include multiple computational cores, for example, a central processing unit (CPU) 110, graphics processing unit (GPU) 120, and/or a digital signal processor (DSP) 130. The SoC 100 may also include an adaptive hardware trace circuit, which includes one or more trace circuits 140A, 140B, 140N (generally referred to as 140), an adaptation logic circuit 170, a trace port funnel circuit 150, and a trace first in first out (FIFO) buffer 160. The SoC 100 may include components not shown in FIG. 1 such as a memory, input/output (I/O) subsystem and other input or control devices. The SoC 100 may include more or fewer subcomponents than those shown in FIG. 1, some of which may be combined into a component or have a different configuration or arrangement. The SoC 100 may have alternative configurations than shown in FIG. 1, including for example, different, fewer, or additional components. In addition, while some of the components in the SoC 100 are described in a singular form, the SoC 100 may include one or more of those components.

The CPU 110 may be embodied using any suitable instruction set architecture and may be configured to execute instructions defined in that instruction set architecture. CPU 110 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 1, SoC 100 may include multiple CPUs. In multiprocessor systems, each of the CPUs may or may not implement the same ISA.

The GPU 120 includes graphics processing circuitry for performing graphical data. For example, GPU 120 may render objects to be displayed into a frame buffer (e.g., one that includes pixel data for an entire frame). GPU 120 may include one or more graphics processors that may execute graphics software to perform a part or all of the graphics operation, or hardware acceleration of certain graphics operations.

The DSP 130 is a circuit configured to execute digital signal processing operations. In some embodiments, the DSP circuit 130 may process digital signals in real time. The DSP circuit may perform operations such as filtering, Fourier transforms, signal analysis, digital modulation/demodulation, and other mathematical operations. The DSP may perform real-time signal processing tasks that require low latency, high throughput, and efficient power consumption.

The computational cores 110, 120, 130 may each generate trace data when trace for the respective core is enabled. The trace data may be collected from a computational core during the execution of the program and is used for trace debugging. The collected trace data may include information associated with function calls, parameter values, register values, memory accesses, and interrupt handling. The format and content of trace data may vary depending on the computational core and the type of data being captured. Depending on the type of trace, the data can be captured at various levels of granularity, ranging from cycle-accurate to high-level events. The SoC 100 may store trace data in various data formats, including binary, ASCII, XML, or JSON.

The trace circuits 140A, 140B, 140N (collectively referred to as 140) may be configured to monitor and store trace data generated by the computational cores. The output of each of the computational cores (e.g., CPU, GPU, DSP) is coupled to the input of a trace circuit 140A, 140B, 140N. For example, referring to FIG. 1, the output of CPU 110 is coupled to the input of trace circuit 1 140A, while the output of GPU 120 is coupled to the input of trace circuit 2 140B, and the output of DSP 130 is coupled to the input of trace circuit N 140N. The trace circuit monitors critical activities and signals associated with traces generated by a computational core. The trace circuit may determine critical activities and signals based on the traces enabled by the user and the priority level assigned to each enabled trace. For example, activities and signals associated with a trace assigned the highest priority level may be considered critical. The trace circuit encodes the trace data into bits and packetizes the bits. The trace circuit may be configured to capture specific types of trace data, such as function calls, memory accesses, or interrupts. The type of trace data captured by trace circuit varies depending on the core or the application. In the embodiment illustrated by FIG. 1, each trace circuit 140 is coupled to a computational core. For example, CPU 110 is coupled to trace circuit 140A, while GPU is coupled to trace circuit 140B, and DSP is coupled to trace circuit 140N. As such, as an example, trace circuit 1 140A may monitor the trace data generated by the CPU, which may include data associated with instructions executed, data values, and addresses. Trace circuit 2 140B may capture data associated with GPU commands, read/write traffic, and latencies. While trace circuit 3 140C may capture data associated with the execution of DSP instructions and register contents.

The trace port funnel circuit 150 may be configured to combine multiple trace sources into a single trace stream. Referring to FIG. 1, the output of each of the trace circuits 140 are coupled to the inputs of the trace port funnel circuit 150. The trace data from the trace circuits 140 may be multiplexed into a common trace stream through the trace port funnel circuit 150 (also referred to as "trace aggregator"). The trace port funnel circuit 150 may include a configurable multiplexer, a compression engine, and a serializer. The trace port funnel circuit may be configured to transmit select trace data from a particular trace source.

The trace FIFO buffer 160 may be implemented as a temporary storage buffer, configured to store trace data before it is sent out of the SoC 100 to the trace port. The output of the trace port funnel circuit 150 may be coupled to the input of the trace FIFO buffer 160. Trace data output by the trace port funnel circuit 150 may be stored in the trace FIFO buffer 160 in a sequential manner, such that the first data to be stored in the buffer may be the first data to be read out of the buffer.

The adaptation logic circuit 170 may be configured to execute a set of actions (e.g., a user-defined action) based on a detected trace FIFO buffer 160 capacity. An input of the adaptation logic circuit 170 may be coupled to an output of the trace FIFO buffer 160. The adaptation logic circuit 170 may be configured to detect and monitor the capacity of the trace FIFO buffer 160. The adaptation logic circuit 170 may be configured to trigger one or more actions of the set of actions in response to the detected FIFO buffer capacity. For example, the adaptation logic circuit 170 may detect that the trace FIFO buffer 160 capacity has exceeded a threshold watermark level (e.g., a predefined watermark level). In response, the adaptation logic circuit 170 may generate and send trace flow control signals to trace circuits 140 or the trace port funnel circuit 150 to drop traces with a desired priority level (e.g., one or more lowest priority levels). In some embodiments, the adaptation logic circuit 170 may generate and transmit handshake signals to the trace circuits 140 to drop a trace. The handshake signals are used to synchronize processes of the adaptation logic circuit 170 and the trace circuits 140.

In some embodiments, the adaptation logic circuit 170 may map a range of trace FIFO buffer 160 capacity to a corresponding priority level. The adaptation logic circuit 170 may use the mapping to convert the detected trace first in first out (FIFO) buffer 160 capacity to a respective priority level. The output of the adaptation logic circuit 170 may be coupled to an input of each of the trace circuits 140 and an input of the trace port funnel circuit 150. The adaptation logic circuit 170 may broadcast the priority level to the trace circuits 140 and the trace port funnel circuit 150. In response, the trace circuits 140 and trace port funnel circuit 150 may drop traces which are assigned a lower priority level than the priority identifier (ID).

In addition, the adaptive hardware trace circuit on the SoC 100 may communicate with a trace tool implemented on a host machine. The trace tool may be implemented as a software circuit on the host machine (e.g., a computer system such as a desktop, laptop, or server). A software developer may use the trace tool to control the trace capture and analysis process through an interface. The host machine may receive the trace data from the trace port of the SoC 100 and provides the trace data to the trace tool. The trace tool may consume and parse the generated trace data and may provide visualization that helps software developers to analyze the failure or performance bottleneck. The interface may be configured to receive user data, such as the enabled traces, the priority levels for each enabled trace and the trace FIFO buffer 160 capacity thresholds (e.g., watermark levels). The interface may also generate one or more graphical user interfaces for use in requesting data from the user or displaying results of the SoC under test. An example of a host machine is further described in FIG. 5.

In some embodiments, one or more subcomponents of SoC 100 or some functionality of these subcomponents may be performed by software components executed on DSP 130, CPU 110 or GPU 120. Such software components may be stored in a system memory (not pictured, but may be as described in FIG. 5).

FIG. 2 is a flowchart illustrating an example process 200 of executing a set of one or more actions in response to a detected trace FIFO buffer 160 capacity, in accordance with an embodiment. The trace tool may receive at 205, from a user, an indication to enable a trace to be captured for one or more computational cores and a priority level assigned to each of the enabled traces. As described in FIG. 1, the present system receives a desired trace to be captured from particular computational cores through the interface of the trace tool. In some embodiments, the user may be able to enable different types of traces to be captured, such as a function trace or an instruction trace from each computational core. The present system further receives an assigned priority level to each enabled trace through the interface of the trace tool. For example, the present system receives three priority levels (e.g., P1, P2, and P3). P1 may be defined as the highest priority level while P3 is the lowest priority level.

The trace tool receives at 210, from the user, one or more trace FIFO buffer capacity thresholds. For example, a user may define three buffer capacity thresholds (e.g., watermark levels), including a first threshold level which may correspond to 25% buffer capacity, a second threshold level which may correspond to 50% buffer capacity, and a third threshold level which may correspond to 75% buffer capacity. Each trace FIFO buffer capacity threshold may indicate a range of capacities that correspond to a set of one or more actions. For example, a buffer capacity within the range of 0% buffer capacity to the first threshold may correspond to a first set of actions. Likewise, a buffer capacity within the range of the first threshold to the second threshold may correspond to a second set of actions.

The SoC may execute a trace operation at 215. The user may start the trace operation by sending a signal to the SoC. As the SoC executes the trace operation, the trace circuits 140 may monitor critical activities and signals generated by the computational cores, encodes the trace data into bits and packetizes the bits. The trace port funnel circuit 150 may receive the packets of trace data generated by the trace circuits 140 and combines the multiple trace data streams into a single stream of trace data. The trace FIFO buffer may store the trace data at 220.

The adaptation circuit may detect the trace FIFO buffer capacity at 225. The adaptation logic circuit 170 may periodically read the capacity of the FIFO buffer to identify the set of actions to perform at 230. An example of an action includes blocking a trace completely. In another example, an action includes disabling a feature within the trace, such as disabling a data trace while leaving an instruction code trace enabled. Another example of an action includes reducing the sampling rate of trace data. For example, performance trace can be sampled less frequently which, in turn, reduces the bandwidth required to collect performance monitor data.

The adaptation circuit may execute the set of one or more actions associated with the trace FIFO buffer capacity at 235. For example, if the adaptation logic circuit detects the trace FIFO capacity exceeding a third threshold level, the system may trigger actions such as to drop the lowest priority traces to reduce the trace data being transmitted to the trace FIFO buffer 160. The adaptation logic circuit 170 may generate and send trace flow control signals to the trace circuits 140 or the trace port funnel circuit 150 to drop traces of certain priority level.

The process of executing a set of one or more actions based on the trace FIFO buffer 160 capacity is further described below in FIG. 3A through 3C.

Figure 3A:
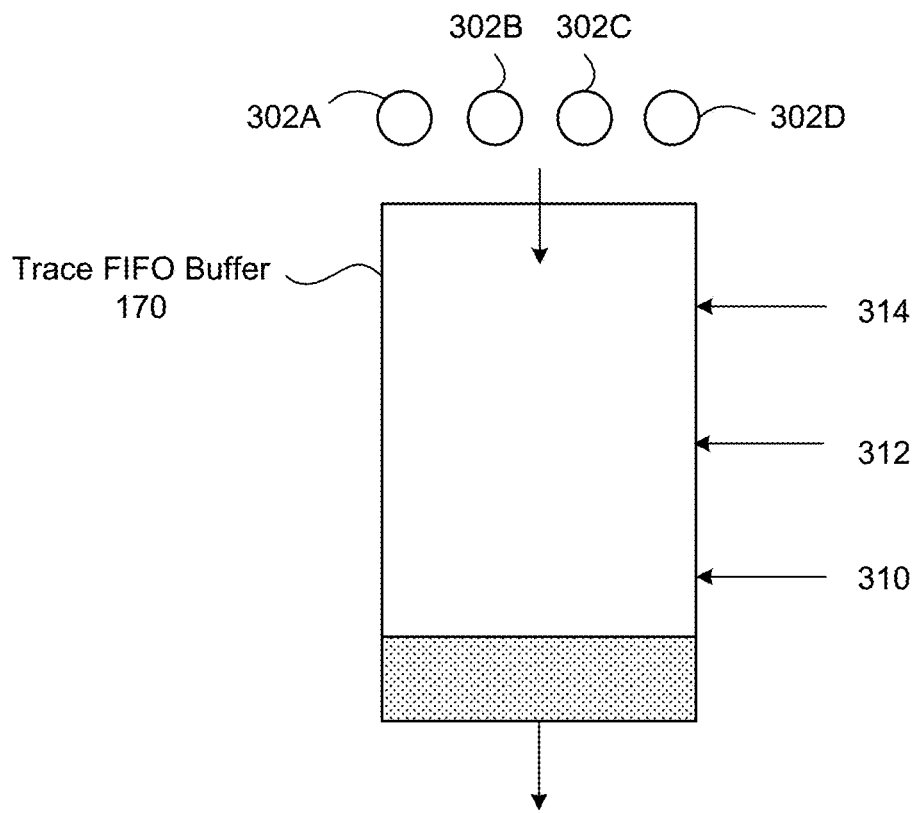
FIG. 3A is a diagram illustrating an example process of filtering trace data based on FIFO buffer capacity below a first watermark level, in accordance with the present disclosure.

FIG. 3A is a diagram illustrating an example process of filtering trace data based on FIFO buffer capacity below a first watermark level, in accordance with the present disclosure. A user may assign a priority to different traces generated by one or more computational cores. The generated trace data 302A, 302B, 302C, 302D, (generally 302) is temporarily stored in the trace FIFO buffer 160 prior to being sent out of the SoC 100. In the example illustrated by FIG. 3A, three watermark levels and three priority levels are defined. Trace data 302 of different priority levels are represented by circles 302. The three watermark levels including a first watermark level 310 corresponding to a 25% buffer capacity, a second watermark level 312 corresponding to a 50% capacity, and a third watermark level 314 corresponding to a 75% capacity. The priority levels may be represented as P1, P2, and P3, with P1 being the highest in priority and P3 being the lowest in priority. The trace data 302A, 302B are assigned to the P1 priority level, while trace data 302C is assigned to the P2 priority level, and trace data 302D is assigned to the P3 priority level.

As the trace operation is executed, the adaptation logic circuit 170 may detect and monitor the trace FIFO buffer 160 capacity to determine the set of one or more actions to execute to manage the generated trace bandwidth. For example, for a trace FIFO buffer 160 capacity up to the first watermark level 310, the adaptation logic circuit 170 may be configured to execute a first set of one or more actions. The first set of one or more actions may include allowing enabled trace data of all priority levels to be generated by the computation cores and stored in the trace FIFO buffer 160.

Figure 3B:
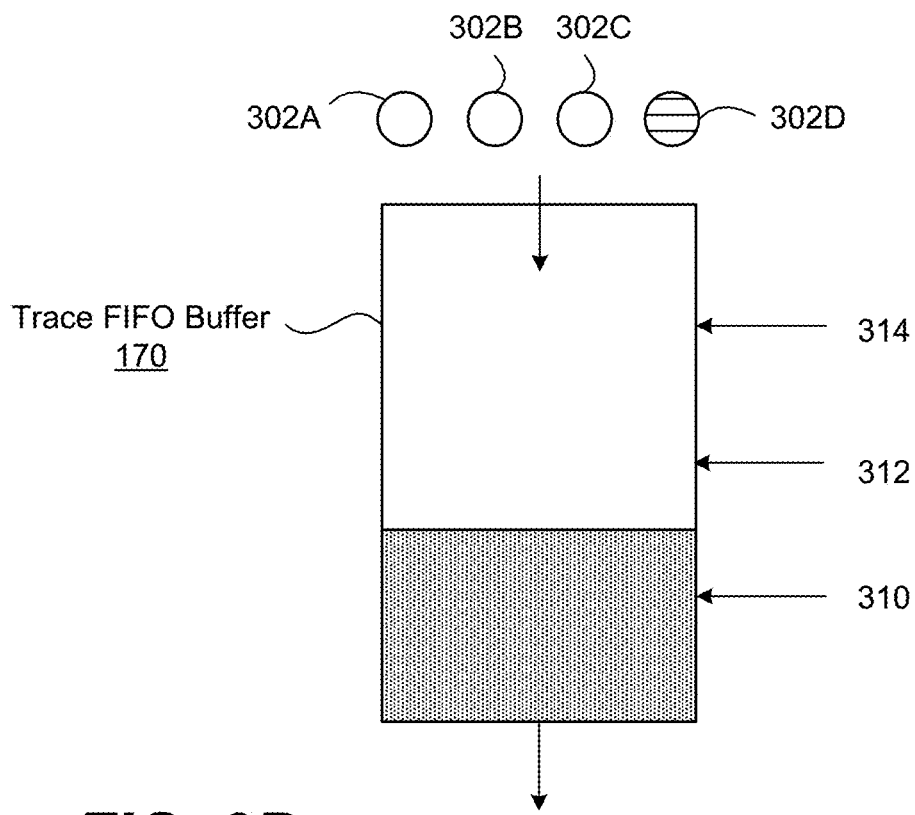
FIG. 3B is a diagram illustrating an example process of filtering trace data based on FIFO buffer capacity above a first watermark level and under a second watermark level, in accordance with the present disclosure.

FIG. 3B is a diagram illustrating an example process of filtering trace data based on FIFO buffer capacity above a first watermark level and under a second watermark level, in accordance with the present disclosure. When the adaptation circuit detects that the trace FIFO buffer 160 capacity has exceeded the first watermark level 310, the adaptation logic circuit 170 may be configured to execute a second set of one or more actions. For example, the user may choose to drop the lowest priority trace data (e.g., priority level P3). As such, the second set of one or more actions may include generating and sending trace flow control signals to the trace circuits 140 and trace port funnel circuit 150 to signal the trace circuits 140 and trace port funnel circuit 150 to drop traces of the priority level P3. As a result, trace data 302D may be dropped by the adaptive hardware trace circuit to reduce the trace data being transmitted to the trace FIFO buffer 160. Trace data 302 dropped by the adaptive trace circuit is represented by circles with a striped fill. If the adaptation logic circuit 170 detects the trace FIFO buffer 160 capacity decrease below the first watermark level 310, the adaptation logic circuit 170 may execute the first set of one or more actions.

It should be noted that trace data 302 of each priority level may be generated by different computational cores in the SoC 100.

Figure 3C:
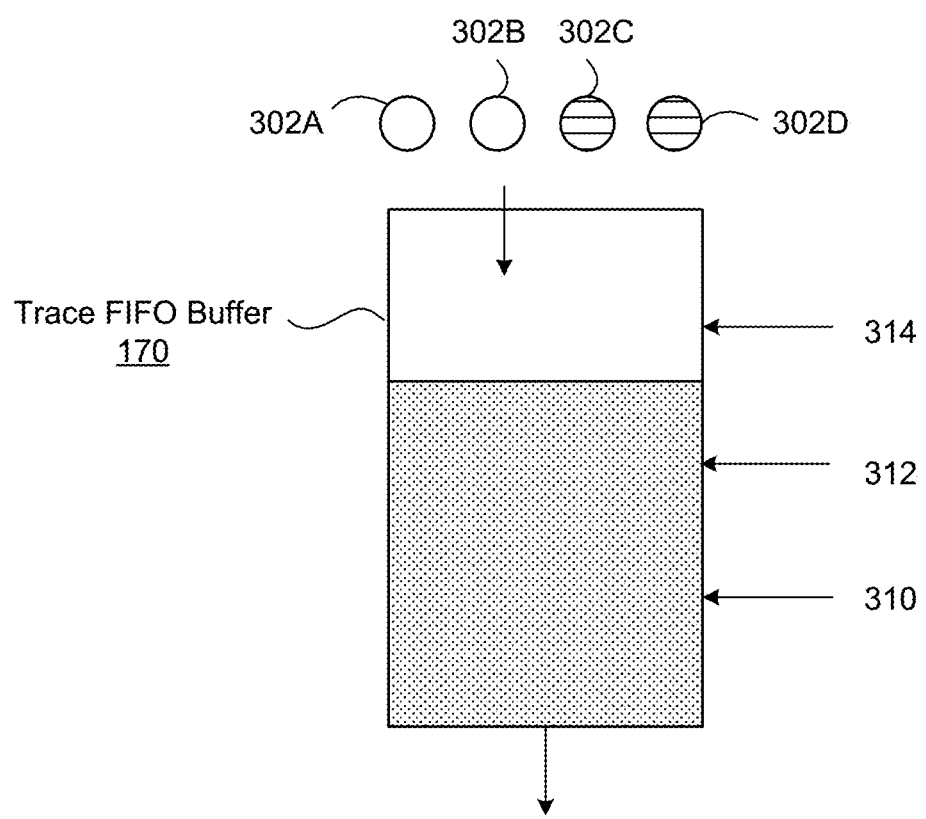
FIG. 3C is a diagram illustrating an example process of filtering trace data based on FIFO buffer capacity above a second watermark level and under a third watermark level, in accordance with the present disclosure.

FIG. 3C is a diagram illustrating an example process of filtering trace data based on FIFO buffer capacity above a second watermark level and under a third watermark level, in accordance with the present disclosure. When the adaptation logic circuit 170 detects that the trace FIFO buffer 160 capacity has exceeded the second watermark level 312, the adaptation logic circuit 170 may be configured to execute a third set of actions. For example, the user may choose to drop trace data of priority level P2 in addition to trace data of priority level P3. As such, the third set of one or more actions may include generating and sending trace flow control signals to the trace circuits 140 and trace port funnel circuit 150 to instruct the trace circuits 140 and trace port funnel circuit 150 to drop traces of the priority level P2 and P3. As a result, trace data 302D may be dropped by the adaptive hardware trace circuit to reduce the generated trace bandwidth.

When the adaptation logic circuit 170 detects that the trace FIFO buffer 160 capacity has exceeded the second watermark level 312, the adaptation logic circuit 170 may be configured to execute a third set of actions. For example, the user may choose to drop trace data of priority level P2 in addition to trace data of priority level P3 to further reduce the trace data being transmitted to the trace FIFO buffer 160. If the adaptation logic circuit 170 detects the trace FIFO buffer 160 capacity decrease below the second watermark level 312, the adaptation logic circuit 170 may execute the second set of actions.

Similarly, the adaptation logic circuit may be configured to execute a fourth set of actions in response to the adaptation logic circuit detecting the trace FIFO buffer 160 capacity exceed the third watermark level 314.

Figure 4:
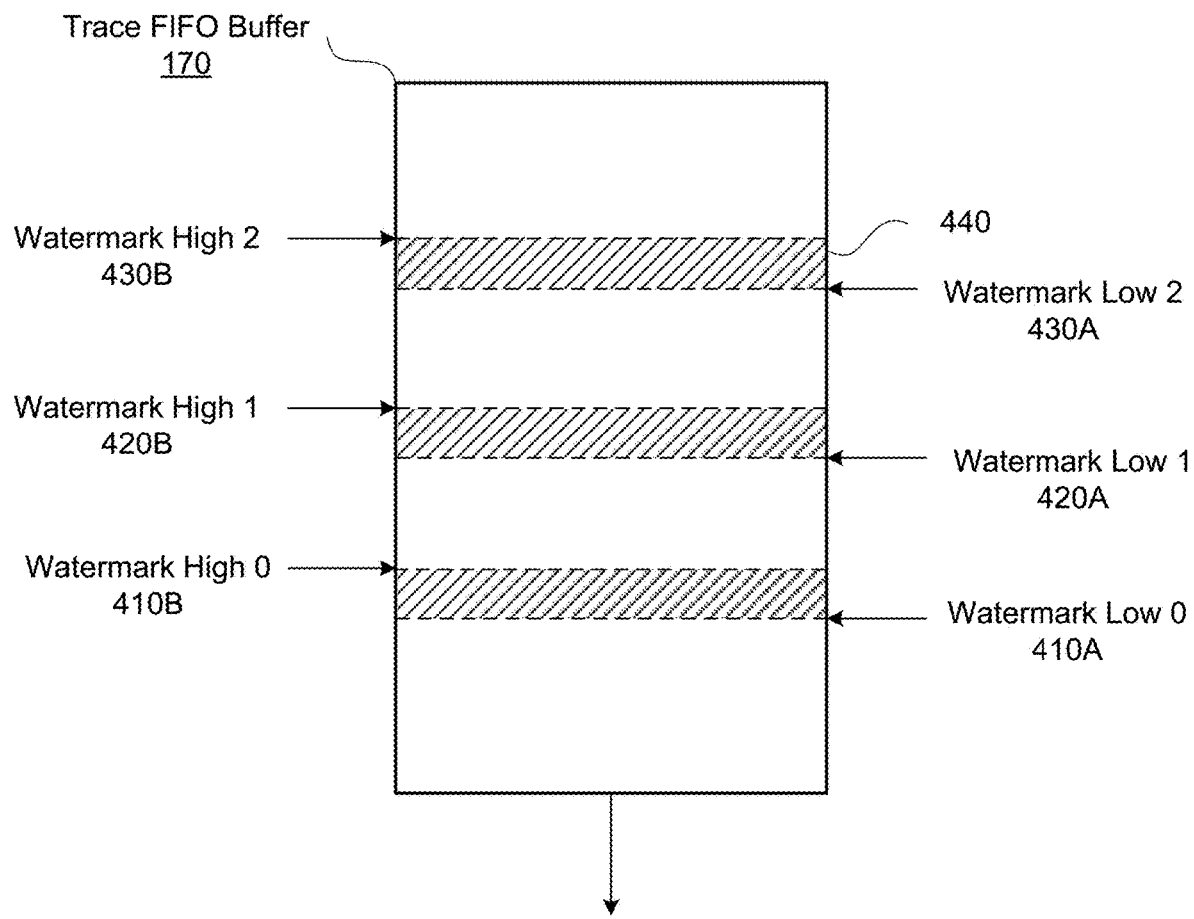
FIG. 4 is a diagram illustrating an example of a trace FIFO buffer configured to allow for hysteresis, according to an embodiment.

FIG. 4 is a diagram illustrating an example of a trace FIFO buffer with assigned watermark levels, according to an embodiment. In some embodiments, the adaptation logic circuit may be configured to allow for hysteresis. Referring to the example illustrated by FIG. 4, the adaptation logic circuit implements three pairs of watermark levels, each pair having a lower watermark level and a higher watermark level. The difference between a lower and higher watermark level may be referred to as a hysteresis window 440. The hysteresis window 440 may help prevent the adaptation logic circuit from switching states back and forth rapidly when the input signal is near the watermark level (e.g., within a threshold level from the watermark level). In the example illustrated by FIG. 4, the adaptation logic circuit 170 may only switch states to execute a second set of one or more actions when the buffer capacity increases beyond watermark high 0 410B or performs a first set of one or more actions when the buffer capacity decreases beyond watermark low 0 410A. The watermark levels may be configured by the user through the interface of the trace tool.

Figure 5:
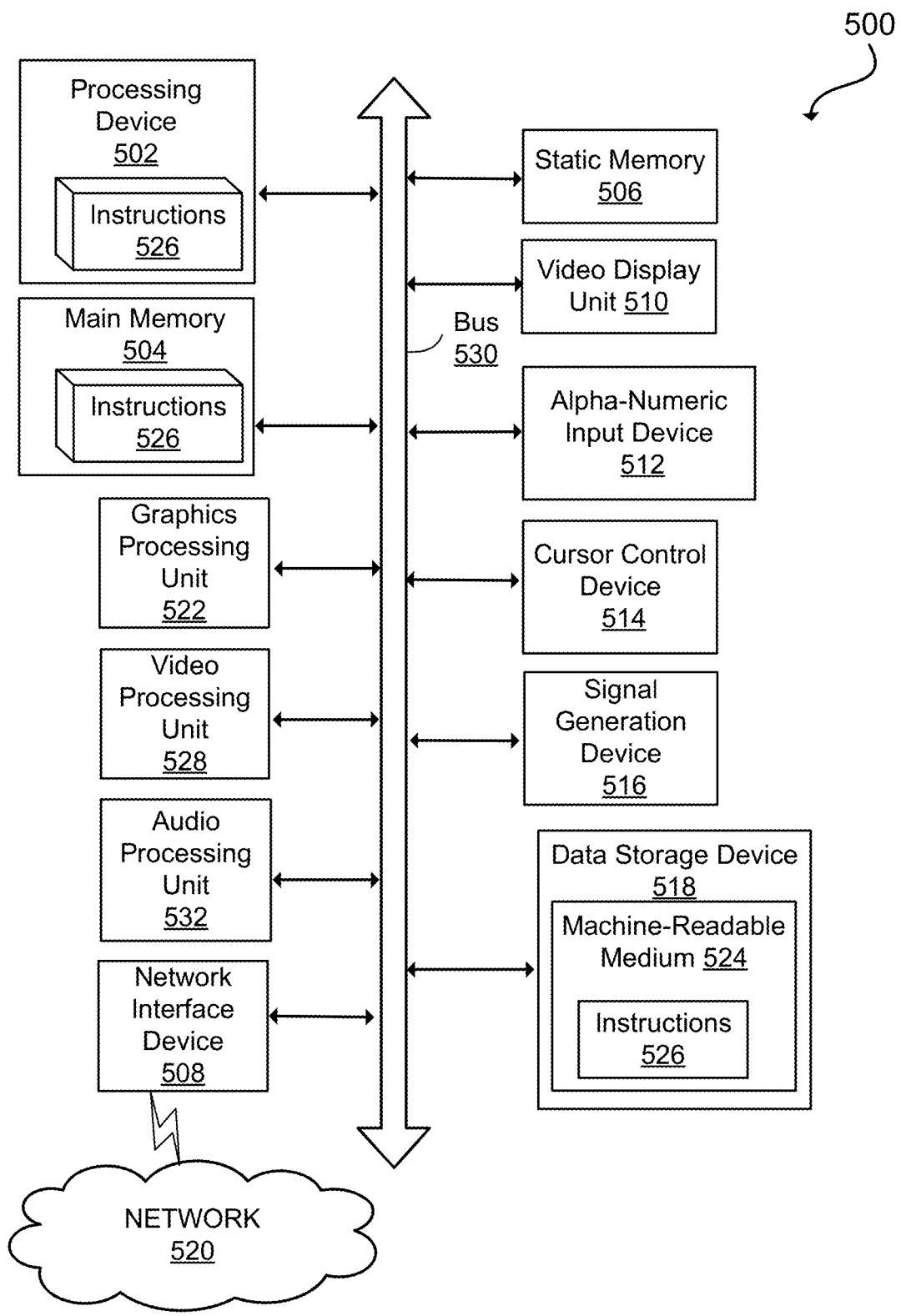
FIG. 5 depicts a diagram of an example computer system in which embodiments of the present disclosure may operate.

FIG. 5 illustrates an example machine of a computer system 500 (e.g., host system) within which a set of instructions, for causing the machine to execute any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment. The example machine 500 may be configured to store instructions and execute processes corresponding to the adaptive hardware trace circuit and the trace tool.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random-access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may be configured to execute instructions 526 for performing the operations and steps described herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a non-transitory computer-readable medium) on which is stored one or more sets of instructions 526 or software embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In some implementations, the instructions 526 include instructions to implement functionality corresponding to the present disclosure. The example machine 500 may be used as a host machine, and instructions 526 may include instructions to implement the trace tool which communicates with the adaptive hardware trace circuit on the SoC 100. As described in FIG. 1, The host machine 500 may be coupled to the SoC 100 via the trace port to receive the trace data generated by the computational cores. Instructions 526 may include instructions to consume and parse the generated trace data and may provide visualization to help software developers analyze the failure or performance bottleneck. The instructions 526 may further include instructions to receive user data, such as the enabled traces, the priority levels for each enabled trace and the trace FIFO buffer 160 capacity thresholds (e.g., watermark levels).

While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 502 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A circuit, comprising:
   one or more processor cores that generates trace data; and
   an adaptive trace circuit coupled to the one or more processor cores, the adaptive trace circuit comprising:
   one or more trace circuits, each trace circuit coupled to a corresponding processor core of the one or more processor cores, wherein each trace circuit captures the trace data generated by the corresponding processor core;
   a trace port funnel circuit coupled to receive trace data from the one or more trace circuits, wherein the trace port funnel circuit combines the trace data into a single stream of trace data;
   a trace buffer having a buffer capacity, wherein the trace buffer stores the single stream of trace data; and
   an adaptation circuit coupled to the trace buffer and the trace port funnel circuit, wherein the adaptation circuit:
   detects a capacity of the trace buffer,
   identifies a first set of one or more actions associated with the capacity of the trace buffer,
   signals the one or more trace circuits to execute the first set of one or more actions,
   generates, using information about the detected capacity, a trace flow control signal, and
   transmits the trace flow control signal to the trace port funnel circuit, wherein the trace port funnel circuit:
   receives the trace flow control signal from the adaptation circuit, and
   responsive to receiving the trace flow control signal, applies a second set of one or more actions to the trace data in relation to the capacity of the trace buffer.

2. The circuit of claim 1, wherein the adaptation circuit further signals the trace port funnel circuit to execute the first set of one or more actions.

3. The circuit of claim 1, wherein the trace buffer is a first in first out (FIFO) buffer.

4. The circuit of claim 1, wherein the adaptation circuit further receives one or more buffer capacity thresholds, wherein a buffer capacity threshold indicates a range of buffer capacities corresponding to the first set of one or more actions.

5. The circuit of claim 1, wherein the adaptation circuit is further coupled to the one or more trace circuits, wherein the adaptation circuit further generates a second trace flow control signal, and transmits the second trace flow control signal to the one or more trace circuits.

6. The circuit of claim 1, wherein the adaptation circuit receives one or more pairs of buffer capacity thresholds, each pair of the buffer capacity thresholds comprising an upper and lower buffer capacity threshold.

7. The circuit of claim 1, wherein the first set of one or more actions comprise at least one of:
   reducing a sampling rate of the trace data generated by the one or more processor cores,
   disabling a feature within a first trace of the trace data, and
   blocking a second trace of the trace data.

8. A computer-implemented method, comprising:
   receiving an indication to enable one or more traces to be captured for one or more processor cores;
   receiving one or more buffer capacity thresholds;
   executing a trace operation to capture the one or more enabled traces;
   storing trace data having the one or more captured traces in a trace buffer;
   determining a capacity of the trace buffer based on the stored trace data, wherein the capacity of the trace buffer corresponds to a first set of one or more actions;
   identifying the first set of one or more actions associated with the buffer capacity;
   generating, by an adaptation circuit and using information about the capacity of the trace buffer, a trace flow control signal;
   transmitting the trace flow control signal from the adaptation circuit to a trace port funnel circuit;
   receiving the trace flow control signal at the trace port funnel circuit; and
   applying, by the trace port funnel circuit and responsive to receiving the trace flow control signal, a second set of one or more actions to the trace data in relation to the capacity of the trace buffer.

9. The computer-implemented method of claim 8, further comprising:
   assigning a priority level for each of the one or more enabled traces; and
   executing the first set of one or more actions based on the assigned priority level.

10. The computer-implemented method of claim 8, further comprising signaling the trace port funnel circuit to execute the first set of one or more actions.

11. The computer-implemented method of claim 10, further comprising:
    generating a second trace flow control signal; and
    transmitting the second trace flow control signal to one or more trace circuits that capture the one or more enabled traces.

12. The computer-implemented method of claim 10, further comprising:
    receiving one or more pairs of buffer capacity thresholds, wherein each pair of the buffer capacity thresholds comprises an upper and lower buffer capacity threshold.

13. The computer-implemented method of claim 8, wherein the trace buffer is a first in first out (FIFO) buffer.

14. The computer-implemented method of claim 8, wherein a buffer capacity threshold indicates a range of buffer capacities corresponding to the first set of one or more actions.

15. The computer-implemented method of claim 11, wherein each range of buffer capacities corresponds to a different action of the first set of one or more actions and the second set of one or more actions.

16. The computer-implemented method of claim 8, wherein the first set of one or more actions comprises at least one of: reducing a sampling rate of the trace data generated by the one or more processor cores, disabling a feature within a first trace of the one or more enabled traces, and blocking a second trace of the one or more enabled traces.

17. A non-transitory computer-readable medium comprising stored instructions that, when executed by one or more processors, cause the one or more processors to:
    receive an indication to enable one or more traces to be captured for one or more processor cores;
    receive one or more buffer capacity thresholds;

execute a trace operation to capture the one or more enabled traces;

store trace data having the one or more captured traces in a trace buffer;

determine a capacity of the trace buffer based on the stored trace data, wherein the capacity of the trace buffer corresponds to a first set of one or more actions;

identify the first set of one or more actions associated with the buffer capacity;

generate, by an adaptation circuit and using information about the capacity of the trace buffer, a trace flow control signal;

transmit the trace flow control signal from the adaptation circuit to a trace port funnel circuit;

receive the trace flow control signal at the trace port funnel circuit; and apply, by the trace port funnel circuit and responsive to receiving the trace flow control signal, a second set of one or more actions to the trace data in relation to the capacity of the trace buffer.

18. The non-transitory computer-readable medium of claim 17, further comprising stored instructions that when executed by the one or more processors, cause the one or more processors to:

assign a priority level for each of the one or more enabled traces; and execute the first set of one or more actions based on the assigned priority level.

\* \* \* \* \*